United States Patent [19]

Sedlacek

[11] Patent Number: 4,574,496
[45] Date of Patent: Mar. 11, 1986

[54] RING-GAP NOZZLE AND ITS APPLICATION IN A FLUIDIZED BED DRYER

[75] Inventor: Franz Sedlacek, Weingarten, Fed. Rep. of Germany

[73] Assignee: Escher Wyss GmbH, Ravensburg, Fed. Rep. of Germany

[21] Appl. No.: 746,007

[22] Filed: Jun. 19, 1985

Related U.S. Application Data

[63] Continuation of Ser. No. 509,025, Jun. 29, 1983, abandoned.

[30] Foreign Application Priority Data

Aug. 30, 1982 [CH] Switzerland ............... 5134/82

[51] Int. Cl.$^4$ ............................................. F26B 17/00
[52] U.S. Cl. ................................. 34/57 A; 110/245; 110/263; 122/4 D; 431/170; 432/58
[58] Field of Search ............... 34/57 A; 431/7, 170; 122/40; 110/245, 263; 432/58

[56] References Cited

U.S. PATENT DOCUMENTS

| | | | |
|---|---|---|---|
| 1,133,711 | 3/1915 | Cornelius | 239/591 |
| 3,040,439 | 6/1962 | Frost | 34/57 A |
| 3,476,322 | 11/1969 | Dyck | 239/515 |
| 3,495,336 | 2/1970 | Gecewich et al. | 34/57 A |
| 3,645,407 | 1/1972 | Wheelock | 239/514 |
| 3,672,577 | 6/1972 | Kramer | 34/57 A |
| 3,708,887 | 1/1973 | Erisman | 34/57 A |
| 3,737,105 | 6/1973 | Arnold et al. | 239/423 |
| 4,062,656 | 12/1977 | Blaser et al. | 34/57 A |
| 4,115,929 | 9/1978 | Staub et al. | 34/57 A |
| 4,309,948 | 1/1982 | Zielinski | 122/4 D |
| 4,346,054 | 8/1982 | Lofgren et al. | 34/57 A |
| 4,371,115 | 2/1983 | Sedlacek et al. | 34/57 A |

FOREIGN PATENT DOCUMENTS

1106820 12/1955 France .
1431763 4/1976 United Kingdom ............... 122/4 D

*Primary Examiner*—Albert J. Makay
*Assistant Examiner*—Steven E. Warner
*Attorney, Agent, or Firm*—Robert A. Ostmann

[57] ABSTRACT

A ring-gap nozzle for distributing a fluid medium over a plate, for instance over a bottom plate in a fluidized bed dryer, having two dish-shaped pressed parts suiting to each other complementarily being assembled in facing relationship and nested into each other and forming a ring gap through which the medium, deflected by 90° or more, flows to the bottom plate, preventing both the settling of the product to be treated in the fluidized bed dryer on the plate as well as the reflux of the product backwardly into the nozzle when the flow of medium is cut off. This type of nozzle is simple to manufacture and does close the passage without any complicated manipulation automatically.

3 Claims, 3 Drawing Figures

RING-GAP NOZZLE AND ITS APPLICATION IN A FLUIDIZED BED DRYER This application is a continuation of application Ser. No. 509,025, filed June 29, 1983, now abandoned.

BACKGROUND OF THE INVENTION

The invention relates to a ring-gap nozzle for distributing a fluid medium over a bottom plate, comprising an axial channel passing through the plate, the said channel being covered by a cap so as to leave a ring gap between the cap and the plate, while the cap is held by means of a connecting member which passes coaxially through the channel and is attached to a clamp which is mounted at the start of the channel, in the direction of a flow of the medium, thus forming an annular flow space in which the medium flowing in the channel region axially is deflected in a deflection space and flows out radially through the ring gap, all walls bounding the flow space being constructed in such a way that the cross section of the flooded area of the ring-shaped flow space continuously decreases in the direction of flow of the medium towards the outlet edge of the ring gap, beginning at least in the deflection space of the flow space.

Ring-gap nozzles of this kind are described for instance in U.S. Pat. No. 4,371,115 and often used in fluidized bed dryers serving there to distribute the medium which holds the granular product in the bed of the dryer fluidized. The special design of the ring-gap nozzles allows the inflowing medium to be conducted to the plate of the fluidized bed dryer in such a way as to prevent the product to be treated from settling on the bottom plate of said fluidized bed dryer as well as to prevent settling of particles entrained by the medium in the channel and in the deflection space of the nozzle.

The disadvantage of the ring-gap nozzles known hitherto, however, is that the product present in the fluidized bed dryer may flow back into the nozzles when the flow of medium is cut off. As the maximum deflection of the medium flow in this type of ring-gap nozzle is 90° or even a bit less, the medium does not coat the bottom plate of the dryer in the proximity of the nozzle in an ideal manner, thus the effect is reduced. Should it be necessary to close the ring-gap nozzles known hitherto, it should demand complicated manipulation. Furthermore, the ring-gap nozzles known thus far are neither easy nor inexpensive to manufacture.

SUMMARY OF THE INVENTION

The aim of this invention is to eliminate the above mentioned disadvantages of previous nozzles and, in particular, to provide a ring-gap nozzle which is simple and inexpensive to manufacture in which the problem of reflux of the product into the nozzle when the flow of medium is cut off is eliminated further, in which the current can be deflected by more than 90° and which closes easily and may serve as a reflux valve.

The invention is defined by a flow space, i.e. the channel and the deflection space, being bounded by the walls of two dish-shaped pressed parts suiting to each other complementarily being assembled in facing relationship and nested into each other with a spacing between them and arranged in a vertical bore through the said plate.

Said type of ring-gap nozzle according to the invention is especially suitable for use in the bottom plate of a fluidized bed dryer.

BRIEF DESCRIPTION OF THE DRAWINGS

The present invention, as well as some practical embodiments of the same, are illustrated in the enclosed drawing.

DESCRIPTION OF THE PREFERRED EMBODIMENTS

Figure 1:
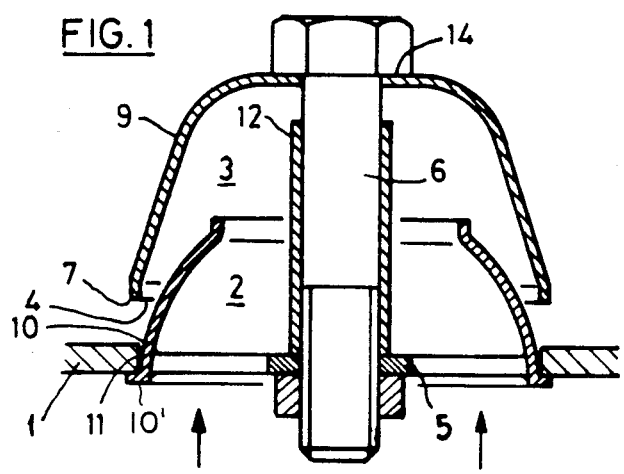
FIG. 1 shows a sectional view of a first example of a ring-gap nozzle.

In the example shown in FIG. 1, a vertical bore 11 is provided in a horizontaly arranged bottom plate 1 of a fluidized bed dryer such as to permit an inflow of a medium e.g. air or steam, into an inner chamber of said dryer where a product is to be fluidized, by means of two dish-spaped pressed parts 9 and 10 suiting to each other complementarily and being assembled in facing relationship and nested into each other, there is a flow space formed between them which includes a channel 2 on the inside of the lower pressed part 10 and a following deflection space 3 on the inside of the upper pressed part 9.

Said upper part 9 has a somewhat larger diameter than the bore 11. The lower part 10 fits snugly into the bore 11 and therefore cannot be displaced when in service. In an other embodiment of the invention, the lower part 10 can also be made to be vertically displacable in said bore 11 which measure will be explained later. The lower part 10 is also provided with a clamp 5 which holds the upper part 9 by means of a connecting member 6 which is screwed in the clamp. Furthermore, lower part 10 includes an outturned flange 10' which is arranged to abut the lower side of bottom plate 1 and positively limit upward movement of part 10 with respect to that plate.

A ring gap 4 is thus left between the outlet edge 7 of the upper part 9 and the bottom plate 1 through which the flowing fluidizing medium is directed at increased velocity and at a deflection of more than 90° towards the plate 1 of the fluidized bed dryer, preventing any settling of the product to be treated. As the deflection is greater than in previous ring-gap nozzles, this design is particularly effective.

The fact that the two dish-shaped pressed parts 9 and 10 are suiting complementarily to each other being in facing relationship and nested into each other prevents the product from flowing back into the deflection space 3 when the flow of the medium is cut off as well as from clogging the feed pipes. This advantageous effect is obtained even though the simple design of the two dish-shaped pressed parts is so extremely simple and inexpensive to manufacture as well as to assemble.

Furthermore, said ring-gap nozzle described above can be easily closed and can thus serve as a reflux valve preventing any reflux when the flow of the medium is cut off. For this purpose, the upper part 9 is held on the connecting member 6 in vertically displaceable manner. A sleeve 12 surrounding and adjoined to the connecting member 6 limites the vertical displacing of the upper part 9 along the connecting member 6. A maximum upper position of the upper part 9 along the connecting member 6 is determined by means of a limit stop 14 provided on the connecting member 6. A maximum lower position of the upper part 9 is given by the point where its outlet edge 7 rests on the bottom plate 1. On this point, the ring-gap is closed for any reflux.

Figure 2:
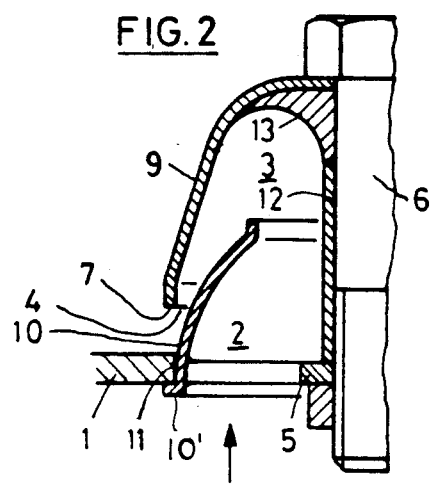
FIG. 2 shows a second example, especially well designed for an optimum flow.

FIG. 2 illustrates a modified ring-gap nozzle in which the upper part of the sleeve 12 is made up of an arched wall 13, which extends to the inner wall of the upper dish-shaped part 9, thus bounding a part of the deflection space 3. With this design, particularly favorable streamlined flow conditions can be created.

For the purpose to serve as a valve there is provided, as mentioned above, that the lower part is made to be vertically displaceable in the bore 11 of the bottom plate 1. When the flow of the medium is cut off the whole nozzle will be displaced vertically downwardly in the bore 11 and will rest on the outlet edge 7 of the upper part 10 on the bottom plate 1 thus closing the passage for any reflux.

Figure 3:
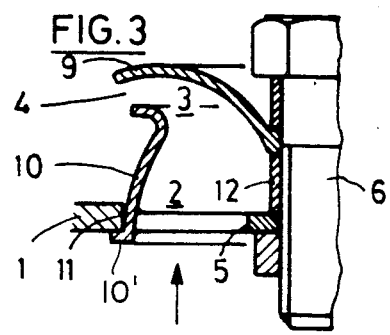
FIG. 3 shows a third example of a ring-gap nozzle.

In the example shown in FIG. 3, the upper end of the lower pressed part 10 is bent in an outward direction in such a way that the deflection space is only bounded by the inner wall of the lower dish-shaped part 10.

In this way, the deflection of the flow is only a bit more than 90° whenever it is wanted. Also this kind of the inventional ring-gap nozzle may serve as a reflux valve when the flow of the medium is cut off. To this aim, the lower part 10 is also made to be displaceable vertically in the bore 11 as described above in connection with FIG. 2. The effect of this measure is the same as described yonder.

I claim:

1. A ring-gap nozzle assembly adapted to fit into a bore extending through the bottom plate of a fluidized bed and to distribute a fluid over the plate, the nozzle assembly comprising upper and lower coaxial, dish-shaped pressed parts interconnected in nesting relationship by a central connecting member carried by a clamp provided on the lower part, the lower part fitting the bore in the bottom plate and having an outturned flange adapted to abut the lower side of the bottom plate, and the upper part having a larger diameter than that bore, whereby movement of the assembly in opposite directions axially of the bore is positively limited by contact of the upper part and the flange with the upper and lower sides, respectively, of the bottom plate, the pressed parts and the connecting member bounding an annular flow path comprising an axial inlet portion through which fluid enters the assembly from below the bottom plate and a deflection space in which fluid delivered through the axial portion is deflected and directed radially outward to an unobstructed ring gap through which fluid exits from the assembly, at least that portion of the flow path including the deflection space having a flow area which decreases continuously in the direction of fluid flow, the upper and lower pressed parts being spaced apart by a sleeve surrounding the connecting members and arranged between the clamp and the upper pressed part, the sleeve being provided with an arched wall extending from the connection member to the inner wall of the upper pressed part and bounding a portion of the deflection space.

2. A ring-gap nozzle assembly adapted to fit into a bore extending through the bottom plate of a fluidized bed and to distribute a fluid over the plate, the nozzle assembly comprising upper and lower coaxial, dish-shaped pressed parts interconnected in nesting relationship and prevented from moving axially relatively to each other by a central connecting member carried by the lower part, the lower part fitting the bore in the bottom plate so as to be freely dispaceable vertically in the bore under the action of the applied fluid and having an outturned flange adapted to abut the lower side of the bottom plate, and the upper part having a larger diameter than the bore, whereby the assembly moves upward to the limit defined by contact between the flange and the lower side of the bottom plate, thereby open the ring gap, when fluid is applied, and the assembly descends to the limit defined by contact between the upper part and the upper side of the bottom plate, to thereby close the ring gap, when the application of fluid is terminated, the pressed parts and the connecting member bounding an annular flow path comprising an axial inlet portion through which fluid enters the assembly from below the bottom plate and a deflection space in which fluid delivered through the axial portion is deflected and directed radially outward to an unobstructed ring gap through which fluid exits from the assembly, at least that portion of the flow path including the deflection space having a flow area which decreases continuously in the direction of fluid flow.

3. A ring-gap nozzle assembly adapted to fit into a bore extending through the bottom plate of a fluidized bed and to distribute a fluid over the plate, the nozzle assembly comprising upper and lower coaxial, dish-shaped pressed parts interconnected in nesting relationship by a central connecting member carried by the lower part, the lower part fitting the bore in the bottom plate snugly in such a way as to be fixed in the bore and having an outturned flange adapted to abut the lower side of the bottom plate and the upper part having a larger diameter than that bore, the connecting member permitting free axial movement of the upper part relatively to the lower part under the action of the applied fluid between a first position in which the upper part contacts the upper side of the bottom plate, and thereby closes the ring gap, and a second position in which the upper part is spaced from the upper side of the bottom plate, and thereby opens the ring gap, the upper part moving to the second position when fluid is applied to the assembly and descending to the first position when the application of fluid is terminated, the pressed parts and connecting member bounding an annular flow path comprising an axial inlet portion through which fluid enters the assembly from below the bottom plate and a deflection space in which fluid delivered through the axial portion is deflected and directed radially outward to an unobstructed ring gap through which fluid exits from the assembly, at least that portion of the flow path including the deflection space having a flow area which decreases continuously in the direction of fluid flow.

* * * * *